United States Patent [19]
Olsson

[11] 3,738,243
[45] June 12, 1973

[54] CONTROL MECHANISM AT PHOTOGRAPHIC CAMERAS FOR FILM ADVANCE IN SEPARATE FILM MAGAZINES EQUIPPED WITH A SERVOMOTOR

[75] Inventor: Kurt Ove Olsson, Goteborg, Sweden

[73] Assignee: Fritz Victor Hasselblad, Goteborg, Sweden

[22] Filed: Aug. 2, 1971

[21] Appl. No.: 168,139

[30] Foreign Application Priority Data
Oct. 2, 1970 Sweden..................13361/70

[52] U.S. Cl. ............ 95/31 AC, 95/31 FL, 352/72
[51] Int. Cl. .......................................... G03b 19/04
[58] Field of Search.................. 95/31 AC, 31 FL, 95/31 R; 352/78 C, 72

[56] References Cited
UNITED STATES PATENTS
3,638,547  2/1972  Sekida...................... 95/31 R Primary Examiner—Samuel S. Matthews
Assistant Examiner—Monroe H. Hayes
Attorney—George Vande Sande

[57] ABSTRACT

This invention relates to photographic cameras with separate film magazines exchangeably attached to the camera housing. A cogwheel projecting out of the camera housing meshes coactingly with a corresponding cogwheel in the film magazine for the transfer of power to advance the film. The normal driving motion of the cogwheel is utilized for controlling a control mechanism in the film magazine equipped with an electric servomotor to advance the film.

7 Claims, 5 Drawing Figures

CONTROL MECHANISM AT PHOTOGRAPHIC CAMERAS FOR FILM ADVANCE IN SEPARATE FILM MAGAZINES EQUIPPED WITH A SERVOMOTOR

BACKGROUND OF THE INVENTION

A well-known type of camera is equipped with so-called interchangeable film magazines, which are exchangeably attached to the main camera housing. Such film magazines, which preferably are used in connection with a picture size of 6 × 6 cm, frequently do not require a separate power source for advancing the film when the roll of film is of normal length. In such instances the power required for advancing the film is transferred to the film magazine from a mechanism within the camera housing. Such film advancing mechanism usually is included as part of a unit which also carries out the function of cocking the shutter, controlling the viewfinder mirror, etc. The required power usually is produced by manual force and transferred by means of a crank or the like.

Alternatively, an electric servomotor incorporated in the camera housing may be used. The power transmission from the camera housing to the film magazine is effected by a cogwheel projecting outwardly from the edge of the camera housing and meshing coactingly with a corresponding cogwheel in the film magazine.

As long as the film magazine is intended to be used for usual film lengths with a normal number of pictures for exposure (i.e., 12 to about 70 exposures, depending on the film type), the film advance mechanism described does not involve any inconveniencies. For some kinds of technical and scientific photography, however, where long series of pictures are to be taken, often with short intervals between each exposure, the capacity of a film magazine of standard type is not sufficient. This kind of photography requires a film magazine adapted to contain film for up to 500 exposures or more. A film magazine of such a large size, of course, requires substantially more power for advancing the film. With a magazine of such large size, the film if advanced by hand, runs too slow and renders it difficult, often even impossible, to obtain a sufficiently rapid exposure succession. If the camera itself is driven by a motor, the additional load caused by a large film magazine causes a too rapid discharge of the current source, usually a built-in battery, which sometimes also is utilized for energizing the exposure meter of the camera. This additional load on the drive motor may also result in the operation of the camera becoming unreliable.

Although it is technically possible per se to utilize the normal film advance mechanism of the camera with film magazines of extra large size, it is not desirable to do so, in view of the aforesaid difficulties. It has been suggested, therefore, to provide a large film magazine with its own built-in electric servomotor and associated power source. The power source may be built in to the film magazine or may be connected to the servomotor by a cable. The servomotor requires a control mechanism to start the motor when the film advance is to commence and to stop the motor when a frame has been advanced. This control mechanism must be synchronized with the afore-described mechanism in the camera housing which actuates the shutter, viewfinder mirror, etc.

The construction and manufacture of a camera housing of a special design, in which the usual drive mechanism for film advance has been replaced by a control device or the like for a servomotor, would be very expensive, because the number of housings to be manufactured would be relatively small. A camera housing of such special design, moreover, would not be adapted for use together with film magazines of standard design. In a number of cases, consequently, a photographer would be required to have both types of camera housings.

SUMMARY OF THE INVENTION

The present invention renders it possible to effect substantial savings and a greater simplicity, because the film advance in the film magazine by a servomotor is controlled by the same mechanism in the camera housing which normally is used to advance the film in the usual film magazine of the camera.

With cameras incorporating the present invention, the camera housing comprises, in addition to the catches for mounting a film magazine, two members for controlling the film advance mechanism in a film magazine intended to be driven from the camera housing, viz. a pressure rod and a cogwheel. The pressure rod, at the time of exposure, projects out of one lateral edge of the camera housing and enters a corresponding hole in the film magazine. When this hole is blocked, either because the magazine slide has not been removed or for some other reason movement of, the pressure rod is obstructed and, consequently, the release mechanism of the camera is blocked. The cogwheel meshes coactingly, in the manner described above, with a corresponding cogwheel in the film magazine and is utilized for film advance, at which time it rotates through one entire revolution.

The cogwheel in a standard film magazine, (i.e., one having no servomotor) also rotates at the time of film advance through one entire revolution, but, contrary to the cogwheel in the camera housing, the magazine cogwheel is a reverse cogwheel. To render possible such reverse motion, the time of cogwheel in the camera housing is cut off such that, after having rotated through an entire revolution at the film advance, it does not project outwardly beyond the camera housing. Instead, the above-mentioned pressure rod and cogwheel are used to control the film advance of a large-size film magazines having a servomotor film drive.

A large capacity film magazine with a servomotor is attached to the camera housing in the same way as the standard magazine. The pressure rod in the camera housing controls the protective slide in front of the film plane of the film magazine having been removed and is actuated by a double-exposure lock in the control mechanism for the film advance. The cogwheel, which in a standard magazine transfers the power from the camera housing to the magazine at the time of advance of the film, here is now replaced by another cogwheel, i.e., the input signal wheel, which also rotates through one complete revolution per advanced frame, but which is not constructed as a reversing wheel. The input signal wheel controls the control mechanism, which includes levers and switches for the servomotor, and towards the end of the revolution indirectly actuates an output signal, which upon completion of the film advance breaks the current to the servomotor. The control mechanism is described in greater detail below by way of a selected example of application.

To enable the control mechanism to function, the input signal wheel always must be in a particular starting position. Normally, the wheel is in such starting position at the beginning of a film advance. When this wheel unintentionally has been displaced from this special position, as for example in connection with the loading of the film magazine, the input signal wheel is no longer in synchronized relationship with the remaining mechanism and this gives rise to operating difficulties. To prevent such difficulties, the film magazine is provided with an attachment catch in the form of a rod which is adapted to be pushed out through a hole in the edge of the film magazine. When the input signal wheel with its associated mechanism is in correct position for the attachment of the film magazine to the camera housing, the attachment catch can be moved into the film magazine and this renders it possible for the magazine to be mounted on the camera housing. If, on the other hand, the input signal wheel is not in its correct starting position, the attachment catch projects out of its hole in the film magazine and is locked there by the control mechanism. In that event the magazine can be attached to the camera box only after the input signal wheel has been turned to its correct initial position so as to release the attachment catch so that it can be withdrawn into the magazine.

BRIEF DESCRIPTION OF THE DRAWINGS

A preferred embodiment of the invention is described in greater detail in the following, with reference to the accompanying drawings.

DETAILED DESCRIPTION OF THE PREFERRED EMBODIMENT

Figure 1:
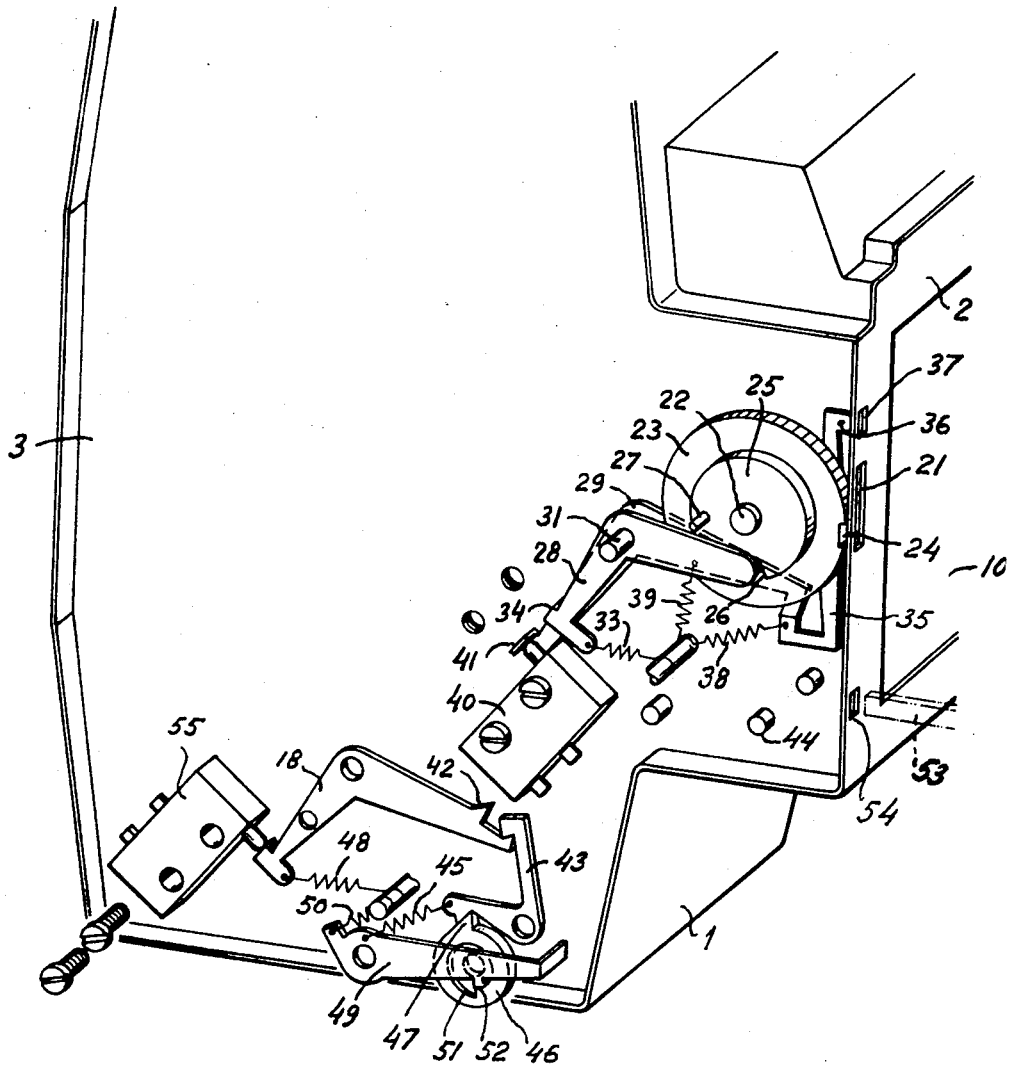
FIG. 1 is a perspective exploded view of a control mechanism for film advance and parts of a film magazine with a servomotor in the position assumed by the mechanism when it is mounted on a camera housing, the drive wheel of the camera having turned the input signal wheel of the control mechanism through one entire revolution.
Figure 2:
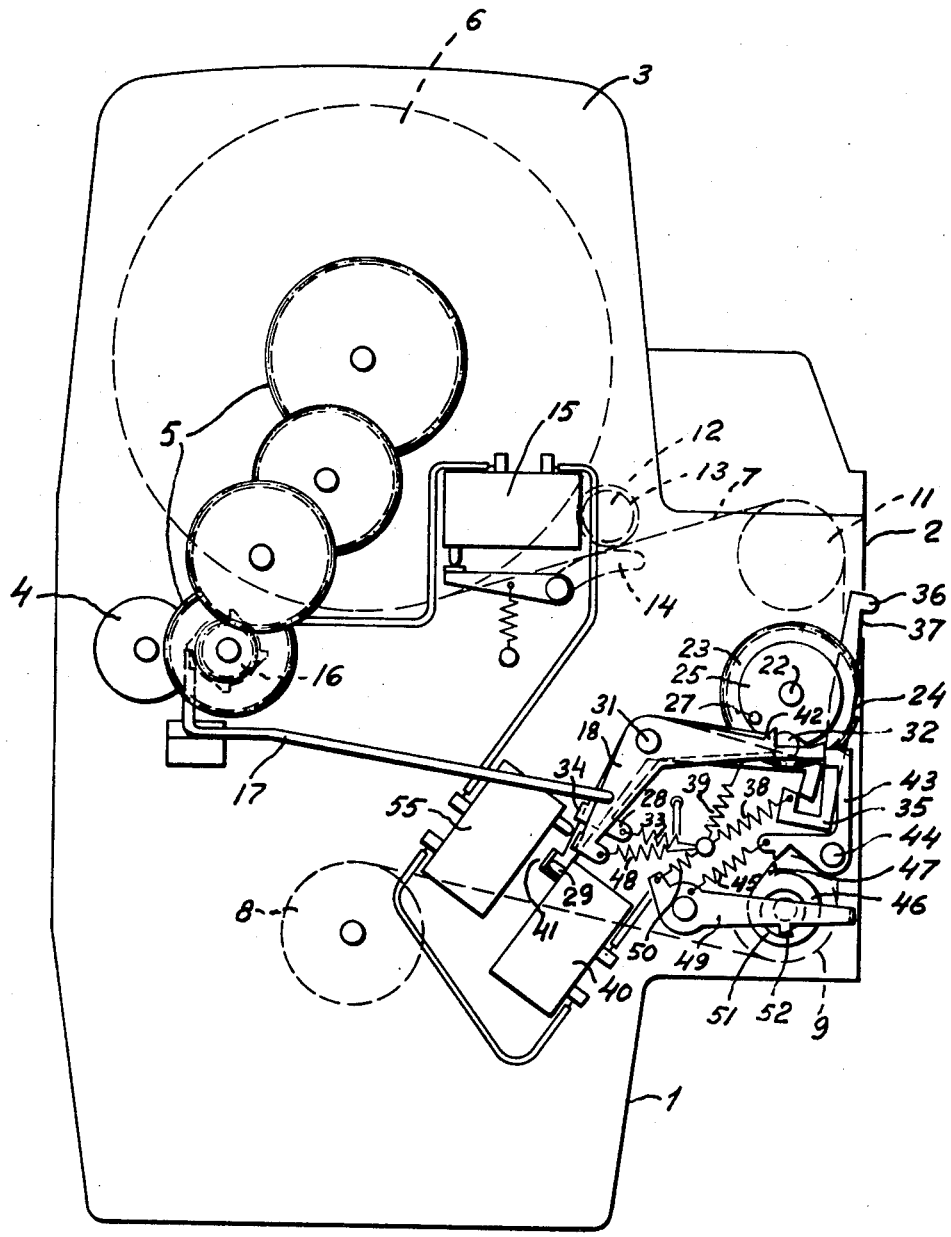
FIG. 2 is an elevational view of a film magazine with drive mechanism and control mechanism, the different parts of the latter being in such a position that the film magazine can be attached to the camera housing.

A film magazine 1 with a servomotor 4 for film advance (FIGS. 1, 2) is attached with its front side 2 against the rear side of a camera housing (not shown), in the same way as a film magazine of the aforesaid standard type, i.e., a film magazine not including a servomotor. Within the space between a cover plate (not shown) and the left-hand end wall 3 of the film magazine 1, the mechanism for film advance and the control mechanism for the servomotor are mounted (FIG. 2). The mechanism for film advance (FIG. 2) comprises an electric servomotor 4 which, subsequent to reduction in a gear unit 5, drives a receiving spool 6 for film 7. Said film 7 is perforated at the edges and runs from a supply spool 8 via a lower deflection roll 9 past a film gate 10 (FIG. 2) to an upper deflection roll 11 and therefrom continues to the receiving spool 6 via a guide roll 12. Said guide roll 12 is provided with a sunken groove 13 disposed directly in front of the contact point for a spring-loaded control arm 14, the object of which is to stop the servomotor 4 at the end of the film. As long as the film 7 passes between the guide roll 12 and the control arm 14, said arm cannot spring into the groove 13. After completed exposure of the film 7, the control arm 14 springs into the groove 13 and thereby actuates a switch 15, which stops the servomotor. In order to be able to rapidly interrupt the film advance after the advance of a frame, a disengaging means 16 is provided between the servomotor 4 and the gear unit 5. Said disengaging means 16 is controlled by a disengaging arm 17 secured in a film advance contact arm 18, which is comprised in the control mechanism and the function of which is described in greater detail below.

Figure 3:
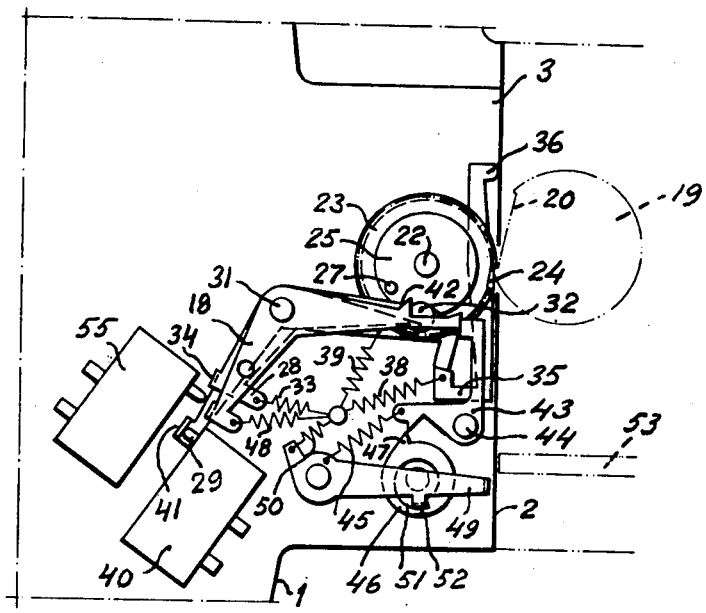
FIG. 3 is a detail elevational view of the control mechanism when the film magazine is mounted on the camera housing and the drive wheel of the camera just meshes coactingly with the input signal wheel of the control mechanism.

A drive wheel 19 projecting out of the camera body (FIGS. 3 and 4) rotates upon the advance of the film through an entire revolution and thereafter rests in its starting and end position, with a cut-off edge 20 facing the front side 2 of the film magazine and generally parallel therewith. When the film magazine 1 is mounted on the camera (FIGS. 1, 3 and 4), the drive wheel 19 is located directly in front of an opening 21 in the front side 2 of the film magazine 1 and upon its rotation meshes coactingly with an input signal wheel 23, which is rotatably mounted on an axle 22 and receives impulses from the camera for film advance. Said input signal wheel 23 is provided with a recess 24 facing the aperture 21 (see FIG. 1) in the front side 2 of the film magazine 1 when the input signal wheel 23 is in its starting and end position. Said recess 24 renders possible a coacting meshing of the drive wheel 19 with the input signal wheel 23 when the rotation of the first-mentioned wheel commences (FIG. 3), and simultaneously renders it possible to determine that the input signal wheel 23 is in its correct starting position when the film magazine 1 is attached to the camera housing.

Figure 4:
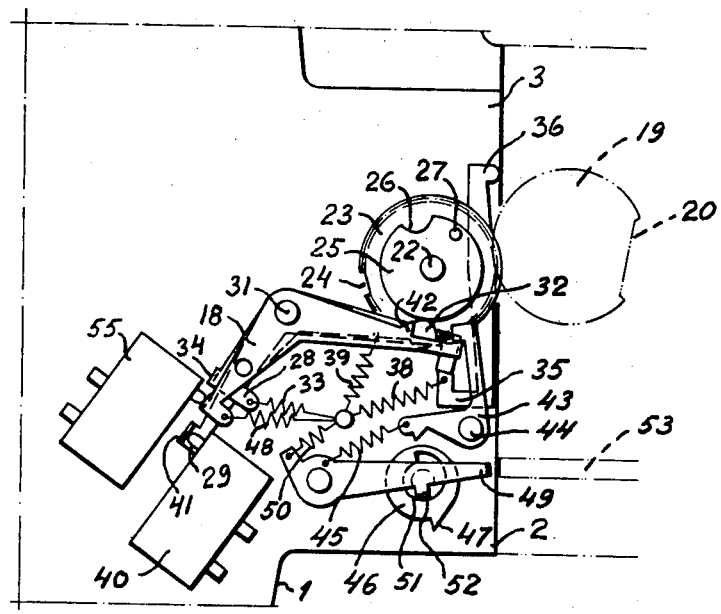
FIG. 4 corresponds to FIG. 3, but here the drive wheel of the camera has been turned through slightly more than half a revolution.
Figure 5:
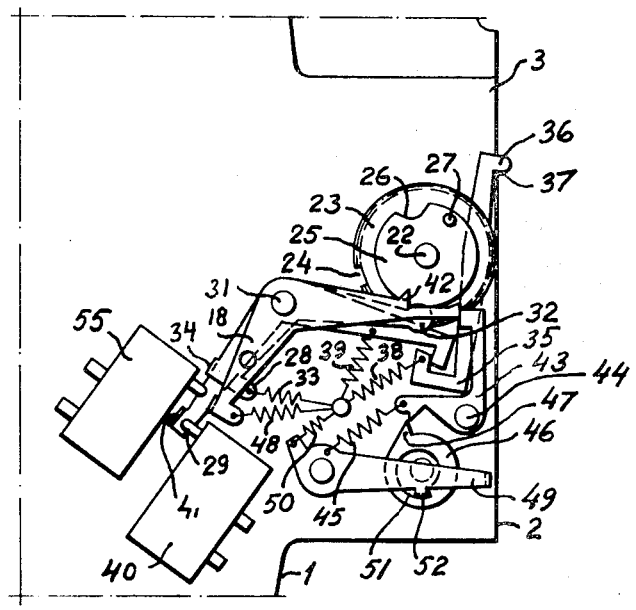
FIG. 5 corresponds to FIGS. 3 and 4, but shows the positions of the different details when, during ongoing film advance, a blocking has occurred.

On said axle 22, which rigidly is connected to the input signal wheel 23, a cam disc 25 is mounted which is provided with a rounded recess 26 on its circumference (FIG. 4) and with a starting pin 27 on its surface remote from the input signal wheel 23. On an axle 31 are mounted in common a follower arm 28, a blocking contact arm 29, and a film advance contact arm 18 (FIGS. 1 and 2). Upon counterclockwise rotation of the input signal wheel 23 by the drive wheel 19, a roller 32, which is mounted on the outer end of the portion of the follower arm 28 facing the cam disc 25, starts climbing up out of its starting position in the recess 26 in the cam disc 25 where it was maintained by action of a relatively strong spring 33 (FIGS. 1 and 2). The follower arm 28 thereby rotates clockwise through such a distance that an angular catch 34 disposed over the blocking contact arm 29 releases said latter arm. Thereby said blocking contact arm 29 is enabled to release an attachment catch 35 mounted on a journal (concealed in the drawing) behind the input signal wheel 23. Said attachment catch 35 includes a catch portion 36 which, when the film magazine 1 is removed from the camera housing 1, projects outwardly through a hole 37 in the front side 2 of the film magazine 1 by action of a spring 38 (FIGS. 2 and 5). A relatively weak spring 39 tending to turn the blocking contact arm 29 clockwise presses said arm 29 against the attachment catch 35. The film magazine 1 being mounted on the camera housing, the attachment catch 35 always is in the position shown in FIGS. 1, 3 and 4 when the catch portion 36 is held pressed in by the rear wall (not shown) of the camera housing.

When, however, the film magazine 1 is removed from the camera, the spring 38 pulls out the catch portion 36 which, when the control mechanism details assume their starting positions shown in FIG. 2, again is pressed in when the film magazine 1 is attached to the camera. If at the time of attachment of the film magazine 1, the input signal wheel 23 is not in its starting position, the follower arm 28 has rotated clockwise in the aforedescribed way, whereby the spring 38 has pulled the attachment catch 35 in clockwise direction, and the spring 39 has pulled the blocking contact arm 29 in clockwise direction to their positions shown in FIG. 5. The attachment catch 35 is now blocked by the blocking contact arm 29, and the catch portion 36 cannot be moved inwardly, thereby preventing the mounting of the film magazine 1 on the camera housing until the input signal wheel 23 has been turned ahead to its correct starting position. The attachment catch, thus, renders impossible the mounting of the film magazine 1 as long as the control mechanism is not in its correct starting position. The free movability of the attachment catch 35 between its extreme positions when the control mechanism is in its starting position and the film magazine 1 is not attached to the camera housing, is due to the fact that the spring 33 with associated lever portion of the follower arm 28 has a higher torque than the spring 39 with its lever portion of the blocking contact arm 29, so that said latter arm does not apply any pressure on the attachment catch 35 in the starting position.

The blocking contact arm 29 actuates a switch 40, which is mounted in the lateral end wall 3 and connected in series with the servomotor 4. The switch 40 is closed in depressed position and, by a pressure plate 41 on the blocking contact arm 29, is maintained in this position as long as everything in the control mechanism according to the aforesaid operates normally. If the mechanism is not in its proper initial position prior to the attachment of the film magazine 1, the attachment catch 35 is in its outwardly extending position, and the blocking contact arm 29 has turned through such a distance in clockwise direction that it has interrupted the current by the switch 40 (FIG. 5). Said switch 40, thus, breaks the current to the servomotor 4 when the control mechanism is not in correct starting position.

During the continued rotation of the input signal wheel 23, the starting pin 27 on the cam disc 25 meets a protuberance 42 on the film advance contact arm 18, so that said arm 18 turns clockwise and closes a switch 55. Hereby all three of the switches 15, 40, 55 are closed, and the servomotor 4 starts the film advance. A hooking arm 43, which from the beginning was in the position shown in FIGS. 2, 3 and 5, now turns counterclockwise about its journal 44 by action of a spring 45 and hooks the film advance contact arm 18, with the switch 55 closed, as shown in FIGS. 1 and 4. When now the film is advanced by the servomotor 4, an output signal wheel 46 driven by the lower deflecting roll 9 is turned counterclockwise until a cam 47 on the output signal wheel 46 releases the hooking arm 43 from the film advance contact arm 18. Thereby a spring 48 so pulls the arm 18 that the switch 55 breaks the current and causes the servomotor 4 to stop. Simultaneously, the disengaging arm 17 mounted on the film advance contact arm 18 disengages the servomotor 4 from the gear unit 5, so that the film advance is stopped as rapidly as possible. The input signal wheel 23 has now been turned through one revolution, and the control mechanism has reassumed its starting position, after the film has been advanced through a distance corresponding to a frame.

When the magazine batteries (not shown) are not fully energized or when a small amount of film is on the receiving spool 6, it could occur that the mechanism in the camera box would release an exposure before completion of the film advance. To guard against this, the control mechanism is provided with a double-exposure catch 49, the motion of which is controlled by a spring 50 and an internal curve 51 formed on the output signal wheel 46. Upon completion of the film advance, a sensing pin 52 rest in the curve 46 on its greatest radius, thereby allowing the pressure rod 53 associated with the camera housing and described above to pass through a hole 54 (FIG. 3). When the film advance is not completed, the hole 54 is blocked by the double-exposure catch 49, and the mechanism in the camera housing waits until the pressure rod 53 upon completion of the film advance moves out.

What I claim is:

1. In a camera of the type having a film magazine which is detachably coupled to the camera housing and wherein the camera housing includes a film advance mechanism comprising a drive wheel which upon film advance rotates through a complete revolution and meshes with a corresponding input wheel in the film magazine, the improvement comprising:

a pressure rod in said camera housing, an aperture in said magazine for at times receiving said pressure rod, said pressure rod being movable between a first position interiorly of said housing and a second position in which said pressure rod protrudes at least in part through said aperture into said magazine, said rod permitting the actuation of the camera for exposure only when said pressure rod is in its said second position, means in said magazine responsive to the advance of the film in said magazine for blocking said aperture except when said film has been fully advanced, and motor means in said magazine governed by the actuation of said input wheel in said magazine by said drive wheel on the camera housing for advancing the film.

2. The apparatus of claim 1 wherein said input wheel also rotates through a complete revolution throughout the advance of the film in the magazine, and switch means responsive to said input wheel for energizing said motor means.

3. The apparatus of claim 1 which further includes a lower deflecting roller driven by the film as it advances through the magazine, an output signal wheel rotatable in response to the turning of said lower deflecting roller, and switch means responsive to said output wheel for deenergizing said motor means.

4. The apparatus of claim 1 which further includes a guide roller in the magazine over which the film is threaded, film responsive means responsive to the presence of the film on said guide roller, said switch means being operable by said film responsive means to energize said motor means only when the film is detected as being present on said guide roller.

5. The apparatus of claim 1 which further includes an attachment catch, said attachment catch at times projecting outwardly of said magazine through an aperture formed in a surface thereof which matingly contacts a corresponding surface on the camera housing when the magazine is secured to the camera housing, and control means for said attachment catch which in a first condition thereof locks said attachment catch in a position where it protrudes outwardly through said aperture and prevents the attachment of said magazine to said camera housing, said control means in a second condition thereof permitting said attachment catch to be pushed inwardly of said magazine so as to permit the attachment of said magazine to said camera housing, and film drive means in said magazine which is operable through a complete cycle for each advance of the film in said magazine, starting and terminating its operation at a predetermined initial position, said control means being operable to its first condition only when said film drive means is in its said initial position.

6. The apparatus of claim 3 wherein said output signal wheel defines a cam surface, said apparatus further including cam follower means and a double-exposure catch, said double-exposure catch blocking said pressure rod from protruding through said aperture except when said output signal wheel is in the initial position it assumes when the film has been fully advanced in the magazine.

7. The apparatus of claim 1 wherein said motor means comprises an electric servomotor, said apparatus further including gear means driven by said servomotor through a disengaging clutch, a disengaging arm responsive to the advance of the film through the magazine and being actuated only when the film advance has been completed, and means controlled by said disengaging arm for decoupling said servomotor from said gear means.

* * * * *